(12) United States Patent
Huang

(10) Patent No.: US 11,063,624 B2
(45) Date of Patent: Jul. 13, 2021

(54) COMMUNICATION DEVICE HAVING TRAINING CIRCUIT AND METHOD THEREFOR

(71) Applicant: REALTEK SEMICONDUCTOR CORP., Hsinchu (TW)

(72) Inventor: Chih-Hung Huang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/834,701

(22) Filed: Mar. 30, 2020

(65) Prior Publication Data
US 2021/0105037 A1    Apr. 8, 2021

(30) Foreign Application Priority Data
Oct. 3, 2019    (TW) .................................. 108135932

(51) Int. Cl.
*H04B 1/38*    (2015.01)
*G06N 20/00*   (2019.01)

(52) U.S. Cl.
CPC .............. *H04B 1/38* (2013.01); *G06N 20/00* (2019.01)

(58) Field of Classification Search
CPC .................................. H04B 1/38; G06N 20/00
See application file for complete search history.

(56) References Cited

U.S. PATENT DOCUMENTS

| | | | |
|---|---|---|---|
| 2009/0219978 A1* | 9/2009 | Mobin | H04L 25/03006 375/219 |
| 2010/0020860 A1* | 1/2010 | Dai | H04L 25/03343 375/231 |
| 2014/0146833 A1* | 5/2014 | Lusted | H04L 12/413 370/437 |
| 2014/0241411 A1* | 8/2014 | Ghiasi | H04L 25/4904 375/231 |
| 2014/0258813 A1* | 9/2014 | Lusted | H04L 1/0009 714/776 |
| 2015/0003505 A1* | 1/2015 | Lusted | H04L 25/4917 375/224 |
| 2020/0259936 A1* | 8/2020 | Lusted | H04L 69/24 |

OTHER PUBLICATIONS

"Physical Medium Dependent Sublayer and Baseband Medium, Type 10GBASE-KR", IEEE 802.3 Clause 72, 2008, pp. 417-451.
Keysight Technologies, "Keysight IEEE MultiGBASE TX EQ Training," Mar. 2019, https://literature.cdn.keysight.com/litweb/pdf/M8070-91020.pdf?id=2816674, 132 pages total.

* cited by examiner

*Primary Examiner* — Jaison Joseph
(74) *Attorney, Agent, or Firm* — Birch, Stewart, Kolasch & Birch LLP

(57) ABSTRACT

A communication device is adapted to perform a communication method. The communication method includes: initializing a link between the communication device and a corresponding device; responding to a being-trained procedure to obtain a being-trained log; and sending a training command string according to the being-trained log. Therefore, the corresponding device adjusts its transmission characteristic according to the received training command string to reach appropriate interoperability between devices.

19 Claims, 2 Drawing Sheets

COMMUNICATION DEVICE HAVING TRAINING CIRCUIT AND METHOD THEREFOR

CROSS-REFERENCE TO RELATED APPLICATION

This non-provisional application claims priority under 35 U.S.C. § 119(a) to Patent Application No. 108135932 in Taiwan, R.O.C. on Oct. 3, 2019, the entire contents of which are hereby incorporated by reference.

BACKGROUND

Technical Field

The present invention relates to a communication method and device, and in particular, to a communication method between communication devices, and to devices applying the method.

Related Art

A development goal of an existing data transmission interface is to improve a data transmission rate. However, a conventional parallel transmission manner can no longer meet a high transmission rate, and instead, a serial transmission interface is used. The serializer/deserializer (SerDes) originally used in fiber optic communications has gradually become a mainstream of the serial transmission interface. The SerDes in a transmitting device converts a multichannel parallel low-speed signal into a high-speed serial signal, and transmits the signal to a receiving device through a transmission medium in a time division multiplexing (TDM) and peer to peer (P2P) transmission mode. Then, SerDes in a receiving device reconverts the signal into the multichannel parallel low-speed signal. In theory, the SerDes can provide a transmission rate of over 10 Gbps. However, if a communication standard cannot specify a signal processing manner of the receiving device, it may lead to an interoperability problem of signal transmission between the transmitting device and the receiving device, and an expected communication could not be achieved.

A 10 G bit Ethernet (10GBASE-KR) technical standard of IEEE 802.3 is taken as an example. To establish a stable connection, a start-up protocol of the standard produces a control instruction by using a control function of a physical medium dependent (PMD) sublayer, to exchange data with a corresponding device to complete a training procedure, and enables an equalizer to play better efficiency to improve interoperability between devices. However, the standard only standardizes a signal transmission manner of the transmitting device, and does not completely define how the receiving device processes the signal. Therefore, the receiving device can only independently determine and process noise and random interference suffered by the received signal.

SUMMARY

As described above, the above technical standard does not define how a receiving device processes a signal. Consequently, when transmitting devices of different manufacturers communicate with receiving devices of different manufacturers, a problem of poor interoperability is caused. When there is interference in a channel, the problem of poor interoperability becomes more serious.

In view of the above, a communication method for reaching interoperability between communication devices and a device applying the method are provided. According to some embodiments, the communication device includes a receiving circuit, a transmitting circuit, a training circuit, and a main control circuit. The receiving circuit is configured to receive a plurality of training commands. The transmitting circuit is configured to transmit a signal according to a transmission characteristic. The training circuit is configured to process the training commands to obtain a being-trained log and obtain a plurality of analysis results; configured to adjust the transmission characteristic according to the analysis results; and configured to send a training command string according to the being-trained log. After the training circuit sends the training command string, the training circuit respectively connects the receiving circuit and the transmitting circuit to the main control circuit.

According to some embodiments, when the main control circuit is actuated (e.g. supplied with power), the main control circuit initializes the training circuit, the transmitting circuit, and the receiving circuit.

According to some embodiments, the training circuit is configured to initialize a link; to obtain the being-trained log in response to a being-trained procedure; and send the training command string according to the being-trained log.

According to some embodiments, that the being-trained procedure responds to the being-trained procedure is that the training circuit receives one of the training commands; processes the received training command to update the being-trained log and to obtain the corresponding analysis result; when the analysis result is an adjustment, adjusts the transmission characteristic and returns to the receiving step; and when the analysis result is completion, ends the being-trained procedure.

According to some embodiments, the method is adapted to a device having a transmitting circuit and a receiving circuit. The communication method includes initializing a link; obtaining a being-trained log in response to a being-trained procedure; and sending a training command string according to the being-trained log. Therefore, the training command string is sent to enable the corresponding device to adjust its transmission characteristic, so as to improve communication interoperability between devices.

According to some embodiments, the being-trained procedure includes: receiving a training command; processing the training command to update the being-trained log and to obtain an analysis result; when the analysis result is an adjustment, adjusting a transmission characteristic and returning to the receiving step; and when the analysis result is completion, ending the being-trained procedure.

According to some embodiments, the being-trained log includes a plurality of training commands, and the sending the training command string is sending the training commands.

According to some embodiments, the sending the training command string includes simplifying the being-trained log to obtain a plurality of simplified commands; and sending the simplified commands.

According to some embodiments, the training command string includes the training commands. The simplifying the being-trained log includes classifying the training commands; respectively obtaining an accumulated adjustment value corresponding to a same classification according to the classifications and the training commands; and obtaining the simplified commands according to the accumulated adjustment values and the classifications.

According to some embodiments, the simplifying the being-trained log includes an optimization procedure. The optimization procedure obtains the simplified commands according to a predetermined tolerance and the accumulated adjustment values Therefore, in some embodiments, interoperability between a corresponding device and communication device is reached. In some embodiments, the above communication device and method include a simplification procedure and/or an optimization procedure to complete a training procedure more effectively.

DETAILED DESCRIPTION

Figure 1:
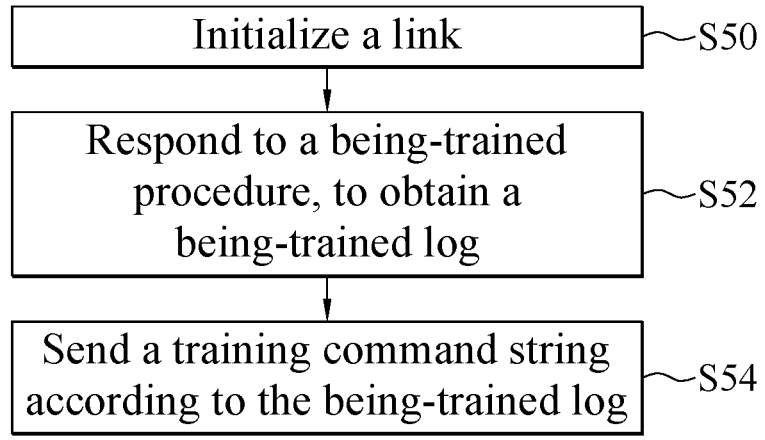
FIG. 1 illustrates a flowchart of an embodiment of a communication method according to the present invention.
Figure 4:
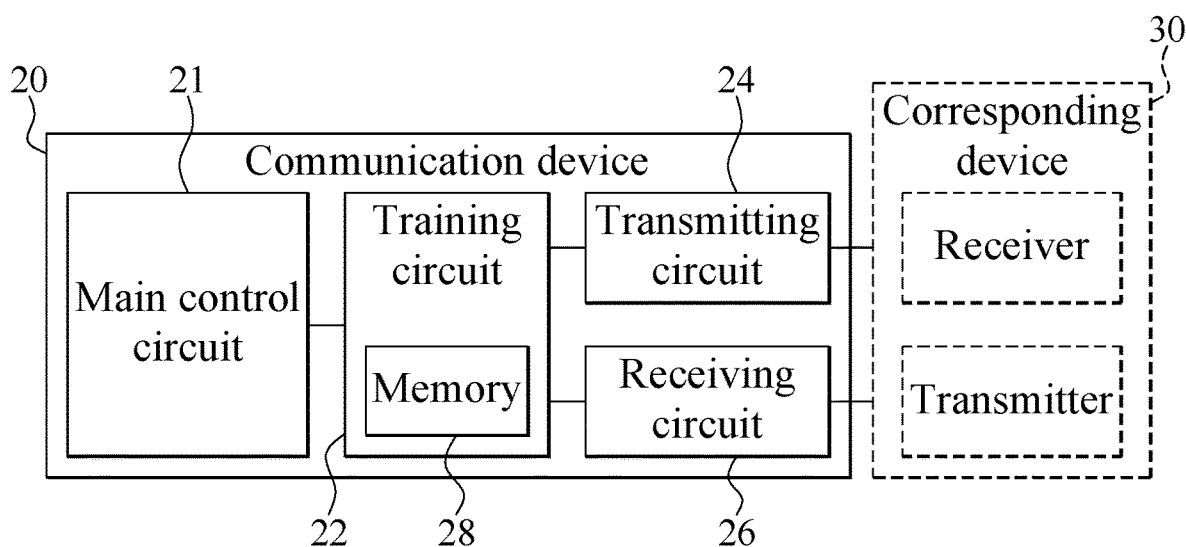
FIG. 4 illustrates a block diagram of an embodiment of a communication device according to the present invention.

Referring to FIG. 1 and FIG. 4 together, FIG. 1 illustrates a flowchart of an embodiment of a communication method according to the present invention. FIG. 4 illustrates a block diagram of an embodiment of a communication device according to the present invention. The communication device 20 is adapted to perform the communication method to make communication link ready with a corresponding device 30. After the communication links of both the communication device and the corresponding device are ready, data can be sent and received normally.

Referring to FIG. 4, the communication device 20 includes a main control circuit 21, a training circuit 22, a transmitting circuit 24, and a receiving circuit 26. The corresponding device 30 has a transmitter and a receiver to correspond to the receiving circuit 26 and the transmitting circuit 24, respectively. After the communication device 20 is actuated (may also be called "supplied with power"), the main control circuit 21 is actuated subsequently. Then, the main control circuit 21 initializes the training circuit 22, the transmitting circuit 24, and the receiving circuit 26. Subsequently, the training circuit 22 sends an initial signal to the corresponding device 30 (called signaling). After actuated, the corresponding device 30 may send an initial signal to the training circuit 22 (called signaling). When the communication device 20 and the corresponding device 30 respectively receive the initial signal sent from the other party, initialization of a link is completed. After the link is initialized, the communication device 20 and the corresponding device 30 perform a training procedure (described later in detail). After the communication device 20 and the corresponding device 30 individually complete the training procedure, the communication link is ready ("Link Ready"). Thereafter, data can be sent and received normally between the communication device 20 and the corresponding device 30.

Still referring to FIG. 1, according to some embodiments, the communication method includes:

Step S50: Initialize a link.

Step S52: Respond to a being-trained procedure, to obtain a being-trained log.

Step S54: Send a training command string according to the being-trained log.

The link of step S50 is an actual data transmission channel. The link is initialized after hardware is initialized. The hardware includes a main control circuit 21, a training circuit 22, a transmitting circuit 24, and a receiving circuit 26. The initializing a link means that each of the communication device 20 and the corresponding device 30 sends an initial signal, and receives the initial signal sent by the other party.

The being-trained procedure of step S52 means that after actuated, and completing the hardware initialization and the link initialization, the corresponding device 30 performs a training procedure on the communication device 20 according to a communication protocol. Specifically, the training procedure sent by the corresponding device 30 to the communication device 20 is used to adjust a transmission characteristic of the transmitting circuit 24 of the communication device 20, while the training procedure sent by the communication device 20 to the corresponding device 30 is used to adjust a transmission characteristic of the corresponding device 30. The executing a being-trained procedure in step S52 means that the communication device 20 responds the training procedure sent by the corresponding device 30. In the process of responding the being-trained procedure, the communication device 20 simultaneously records each command of the being-trained procedure, to obtain the being-trained log. Therefore, the being-trained log includes a plurality of training commands. An example of the being-trained procedure is described later in detail.

Step S54 means that a training command string is sent according to the being-trained log. In some embodiments, the sending the training command string is directly sending each training command recorded in the being-trained log to the corresponding device 30, so that the corresponding device 30 adjusts the transmission characteristic according to the being-trained log.

In some embodiments, the sending the training command string according to the being-trained log includes a simplification procedure, which is described later in detail.

Through the above steps S50 to S54, the corresponding device 30 requires, according to characteristics of channels and the received signal sent by the communication device 20, the communication device 20 to adjust the transmission characteristic. All training commands that have been adjusted are recorded by the communication device 20 as the being-trained log, and the communication device 20 sends the training command string according to the being-trained log, so that the transmission characteristic of the corresponding device 30 is adjusted in the same way. Therefore, in a case in which the characteristics of the channels are similar or the same, appropriate interoperability can be obtained.

In some embodiments, the training circuit 22 of the communication device 20 performs a training procedure (step S50) on the corresponding device 30, that is, the training circuit 22 sends a series of training commands (called active commands below) according to the received signal sent by the corresponding device 30 and the characteristics of the channels. The active commands require the corresponding device 30 to adjust its transmission characteristic. After the training circuit 22 trains the corresponding device 30 according to a training mechanism preset by the communication device 20, the training circuit 22 obtains an interoperability characteristic (called an active interoperability characteristic below) of the receiving circuit 26. For example, the interoperability characteristic is but not limited to a bit error rate (BER). Then, the training circuit 22 sends the training command string (called the passive commands below) according to the training procedure (step S52). After the corresponding device 30 adjusts the transmission characteristic according to the passive commands, the training circuit 22 obtains another interoperability characteristic (called a passive interoperability characteristic below) of the receiving circuit 26. Further, the training circuit 22 compares the active interoperability characteristic with the passive interoperability characteristic to determine which is better. Then, the training circuit 22 trains the corresponding device 30 through the training command string corresponding to the better interoperability characteristic (step S54). Specifically, when the active interoperability characteristic is superior to the passive interoperability characteristic, the training circuit 22 trains the corresponding device 30 through the active commands. Otherwise, the training circuit 22 trains the corresponding device 30 through the passive commands. In this way, the communication device 20 can obtain appropriate interoperability.

In the above embodiment of determining the active interoperability characteristic and the passive interoperability characteristic, after the corresponding device 30 adjusts the transmission characteristic according to the active commands (step S50), and before the communication device 20 sends the passive commands (step S52), the transmission characteristic of the corresponding device 30 needs to first return to an initial status, and then the passive commands are sent, to avoid an accumulative error. In some embodiments, the communication device 20 may directly compare differences of the active commands and the passive commands, and directly send the corresponding training command string according to the differences, so that the corresponding device 30 performs corresponding adjustment. Similarly, before the above step S54 is preformed, the communication device 20 needs to consider that the transmission characteristic of the corresponding device 30 has been adjusted according to the passive commands, and then the communication device 20 sends the corresponding training command.

Figure 2:
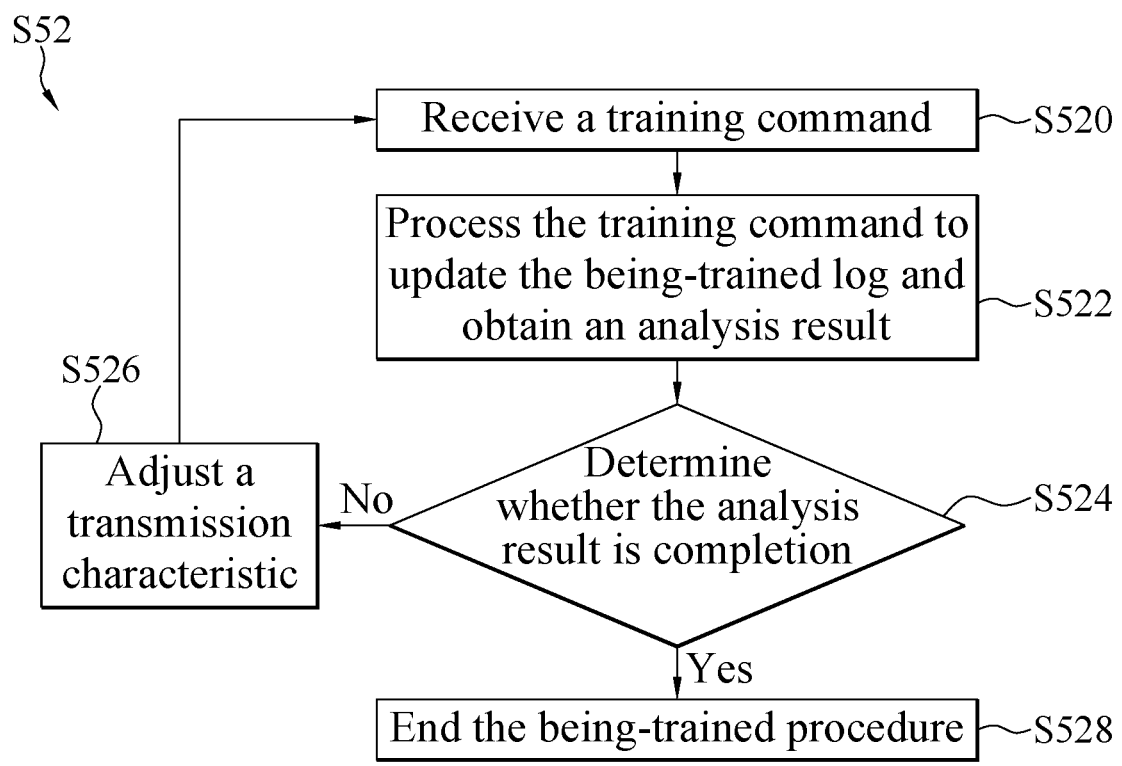
FIG. 2 illustrates a flowchart of an embodiment of step S52 in FIG. 1.

Then, referring to FIG. 2 as well, FIG. 2 illustrates a flowchart of an embodiment of step S52 in FIG. 1. Step S52 is that the communication device 20 responds to the being-trained procedure sent by the corresponding device 30 to obtain a being-trained log. The being-trained procedure includes a plurality of training commands, and the being-trained procedure includes:

Step S520: Receive a training command.

Step S522: Process the training command to update the being-trained log and obtain an analysis result.

Step S524: Determine whether the analysis result is completion.

Step S526: When the analysis result is not completion (is an adjustment), adjust a transmission characteristic according to the training command, and return to the receiving step (S520).

Step S528: When the analysis result is completion, end the being-trained procedure.

The being-trained procedure of S52 is sent by the corresponding device 30 to the communication device 20. In step S520, the communication device 20 receives the training command sent by the corresponding device 30. Then, in step S522, the training circuit 22 of the communication device 20 processes the training command. The processing of the training command includes storing the training command into a being-trained log and analyzing the training command to obtain an analysis result. The order of storing and analyzing may be switched.

For the analyzing the training command, a 10 G bit Ethernet (10GBASE-KR) technical standard of IEEE 802.3 is taken as an example, but the scope of the present invention is not limited thereto. The range standardized by the technical standard for the training command is shown in Table 1 below.

TABLE 1

| Bit (Cell(s)) | Parameter name | Adjustment manner (Description) |
| --- | --- | --- |
| 1:0 | High frequency of signal | 1 0 |
| | | 1 0 = increment |
| | | 0 1 = decrement |
| | | 0 0 = hold |
| 3:2 | Low frequency of signal | 3 2 |
| | | 1 0 = increment |
| | | 0 1 = decrement |
| | | 0 0 = hold |
| 5:4 | Signal amplitude | 5 4 |
| | | 1 0 = increment |
| | | 0 1 = decrement |
| | | 0 0 = hold |
| 6 | Initialization | 1 = initialize coefficients |
| | | 0 = normal operation |

In the technical standard, each training command includes seven bits used to train the transmission characteristic, and three types of characteristics of adjustment, including high frequency of signal (bit 0 to 1), low frequency of signal (bit 2 to 3), and signal amplitude (bit 4 to 5). Manners of adjustment include increment, decrement, and hold (remaining unchanged). Therefore, when analysis results are increment, decrement, and hold of the high frequency of the signal, increment, decrement, and hold of the low frequency of the signal, and increment, decrement, and hold of the signal amplitude, the analysis results thereof are all "adjustment".

According to the technical standard, a being-trained log is taken as an example shown in Table 2 below, and the being-trained log includes 15 training commands. The communication device 20 sequentially adjusts the transmission characteristic of the transmitting circuit 24 according to the 15 training commands from the corresponding device 30. For example, taking the training command sequence number 1 as an example, an analysis result of the training circuit 22 analyzing the training command (0100000) is "increasing signal amplitude". Taking the training command sequence number 3 as an example, an analysis result of the training circuit 22 analyzing the training command (0001000) is "increasing low frequency of signal". When the training circuit 22 analyzes the training command (0000000) of the training command sequence number 14, an analysis result thereof is "completion", and then the training circuit 22 ends the being-trained procedure. In addition, an analysis result of the training circuit 22 analyzing the training command (1000000) of the training command sequence number 0 is "initialization", and then the training circuit 22 initializes the transmission characteristic of the transmitting circuit 24.

TABLE 2

| Received training command sequence | Analysis result | Training command (bit 6, 5, 4, 3, 2, 1, 0) |
| --- | --- | --- |
| 0 | Initialization | 1000000 |
| 1 | Increasing amplitude | 0100000 |
| 2 | Increasing amplitude | 0100000 |
| 3 | Increasing low frequency | 0001000 |
| 4 | Decreasing high frequency | 0000001 |
| 5 | Decreasing amplitude | 0010000 |
| 6 | Increasing high frequency | 0000010 |

TABLE 2-continued

| Received training command sequence | Analysis result | Training command (bit 6, 5, 4, 3, 2, 1, 0) |
|---|---|---|
| 7 | Increasing low frequency | 0001000 |
| 8 | Increasing low frequency | 0001000 |
| 9 | Decreasing low frequency | 0000100 |
| 10 | Decreasing high frequency | 0000001 |
| 11 | Increasing amplitude | 0100000 |
| 12 | Increasing low frequency | 0001000 |
| 13 | Decreasing high frequency | 0000001 |
| 14 | End the being-trained procedure (completion) | 0000000 |

Therefore, when the communication device 20 receives the training command sequence number 1, the training circuit 22 controls the transmitting circuit 24 to adjust the transmission characteristic of the transmitting circuit 24, to increase the signal amplitude (step S526) (that is, adjusting the transmission characteristic according to the analysis result). Then, the training circuit 22 returns to the receiving step (S520). When the communication device 20 receives the training command sequence number 2, an analysis result of the training circuit 22 analyzing the training command is increasing the signal amplitude. Therefore, the training circuit 22 controls the transmitting circuit 24 to adjust the transmission characteristic of the transmitting circuit 24, to increase the signal amplitude. Further, when the communication device 20 receives the training command sequence number 3, an analysis result of the training circuit 22 analyzing the training command is increasing the low frequency of the signal. Therefore, the training circuit 22 controls the transmitting circuit 24 to adjust the transmission characteristic of the transmitting circuit 24, to increase the low frequency of the signal. The rest may be deduced by analogy. When the communication device 20 receives the training command sequence number 14, an analysis result of the training circuit 22 analyzing the training command is "completion". Therefore, the training circuit 22 ends the being-trained procedure.

Therefore, the communication device 20 adjusts the transmission characteristic of the signal of the transmitting circuit 24 through the being-trained procedure in step S52.

Figure 3:
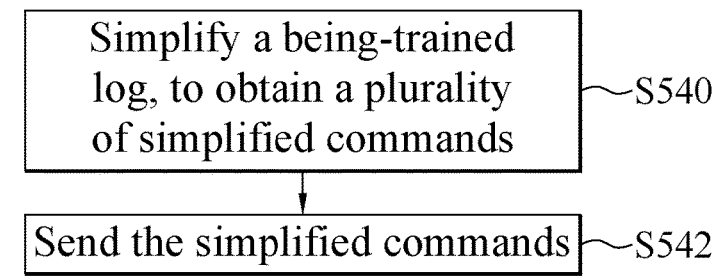
FIG. 3 illustrates a flowchart of an embodiment of step S54 in FIG. 1.

Referring to FIG. 3, according to some embodiments, step S54 includes a simplification procedure, and the simplification procedure includes:

Step S540: Simplify a being-trained log to obtain a plurality of simplified commands.

Step S542: Send the simplified commands.

The simplifying the being-trained log in step S540 is simplifying increasing commands and decreasing commands that cancel out each other in the training commands (examples are shown later). Specifically, the simplifying the being-trained log in step S540 includes:

Step S540a (which is not shown in the figure): Classify the training commands.

Step S540b (which is not shown in the figure): Respectively obtain, according to the classifications and the training commands, an accumulated adjustment value corresponding to a same classification.

Step S540c (which is not shown in the figure): Obtain the simplified commands according to the accumulated adjustment values and the classifications.

The simplified commands include training commands such as initializing, adjusting the transmission characteristic, and ending the training procedure.

For the simplifying the being-trained log above, referring to Table 2 together, the being-trained log includes 15 training commands. After training commands of initializing and ending the being-trained log are deducted, there are 13 training commands used to adjust the transmission characteristic. Therefore, an accumulated adjustment value corresponding to a same classification may be obtained by classifying the training commands, and the simplified commands are obtained according to the accumulated adjustment values and the classifications. An result of adjusting the transmission characteristic by the simplified command is that:

high-frequency signal is accumulatively decreased by 2 times;

low-frequency signal is accumulatively increased by 3 times; and signal amplitude is accumulatively increased by 2 times.

Therefore, through the simplification procedure, in the above example, the training command that is of the being-trained log and used to adjust the transmission characteristic only needs to be completed by using 7 simplified commands (2+3+2). In general, the communication device 20 needs to send only 9 simplified commands to make the corresponding device 30 adjust the transmission characteristic, so as to reduce the transmission times of the training command and save transmission resources and time.

In some embodiments, that the obtaining the simplified commands according to the accumulated adjustment values and the classifications in step S540c includes an optimization procedure, and the optimization procedure compensates differences of initial transmission characteristics of different devices according to a predetermined tolerance of different classifications and the accumulated adjustment values. The above predetermined tolerance is related to a norm tolerance of the technical standard for the transmission characteristic. The above-mentioned 10 G bit Ethernet (10GBASE-KR) technical standard of IEEE 802.3 is taken as an example, and the standard sets the norm tolerance of the amplitude of the transmission characteristic to +/−10%. The norm tolerance is to standardize ratios of a precursor of a pulse signal responding to a channel to a cursor and a postcursor of a pulse signal responding to a channel to a cursor. Based on the norm tolerance of +/−10%, assuming that the communication device 20 and the corresponding device 30 are respectively at an upper limit and a lower limit of the norm tolerance, a difference between initial transmission characteristics of the communication device 20 and the corresponding device 30 is 20%. When converted into times of increasing/decreasing the signal amplitude, the 20% difference is the above predetermined tolerance.

Therefore, when the optimization procedure is performed, the training circuit 22 sends the accumulated adjustment values to the corresponding device 30 and then sends commands to adjust the corresponding device 30 within the predetermined tolerance. After the corresponding device 30 adjusts its transmission characteristic according to the accumulated adjustment value and transmits the signal back, the training circuit 22 determines and records the interoperability characteristic of the corresponding device 30. After the training circuit 22 records each interoperability characteristic in the above predetermined tolerance, an optimal interoperability characteristic and its corresponding adjustment value can be obtained and selected as the final adjustment value. Thereafter, the training circuit 22 sends commands to adjust the corresponding device 30 to adjust its transmission characteristic to the adjustment value corresponding to the optimal interoperability characteristic.

Through the above optimization procedure, the training circuit 22 compensates differences of initial transmission characteristics of different devices to reach better interoperability.

Referring to FIG. 4, according to an embodiment, a communication device 20 includes a main control circuit 21, a training circuit 22, a transmitting circuit 24, and a receiving circuit 26. The receiving circuit 26 is configured to receive a plurality of training commands. The transmitting circuit 24 is configured to transmit a signal according to a transmission characteristic. The training circuit 22 is configured to process the training commands to obtain a being-trained log and to obtain a plurality of analysis results; configured to control the transmitting circuit 24 according to the analysis results to adjust the transmission characteristic; and configured to send a training command string according to the being-trained log. After the training circuit 22 sends the training command string, the training circuit 22 respectively connects the receiving circuit 26 and the transmitting circuit 24 to the main control circuit 21.

Therefore, the training circuit 22 sends the training command string to enable a corresponding device 30 to adjust the transmission characteristic thereof, to obtain appropriate interoperability.

After the communication device 20 is actuated (is supplied with power), the main control circuit 21 is actuated. Then, the main control circuit 21 initializes the training circuit 22, the transmitting circuit 24, and the receiving circuit 26. Further, the training circuit 22 performs the above steps S50 to S54, which are not described again.

That the training circuit 22 processes the training commands to obtain the being-trained log and the analysis results is obtained by performing the above step S52.

In some embodiments, the training circuit 22 includes a memory 28 configured to store the being-trained log.

The receiving circuit 26 is configured to receive a plurality of training commands. The transmitting circuit 24 is configured to transmit a signal according to a transmission characteristic. The training circuit 22 is configured to process the training commands to obtain a being-trained log and obtain a plurality of analysis results, and configured to adjust the transmission characteristic according to the analysis results. Still referring to FIG. 4, the training circuit 22 further includes a memory 28 configured to store a being-trained log. When actuated, a main control circuit 21 initializes the receiving circuit 26, the transmitting circuit 24 and the training circuit 22. After the training circuit 22 completes the sending of the training command string, and the main control circuit 21 receives and transmits signals forwarded by the receiving circuit 26 and the transmitting circuit 24, respectively, from the corresponding device 30.

In conclusion, according to some embodiments, when actuated, the communication device 20 and the corresponding device 30 start to operate, so as to reach appropriate interoperability between devices according to the above communication method.

What is claimed is:

1. A communication device, comprising:
   a receiving circuit, configured to receive a plurality of training commands;
   a transmitting circuit, configured to transmit a signal according to a transmission characteristic;
   a training circuit,
   configured to process the training commands, to obtain a being-trained log and obtain a plurality of analysis results;
   configured to control the transmitting circuit according to the analysis results to adjust the transmission characteristic; and
   configured to send a training command string according to the being-trained log; wherein the training command string is substantially the same as the be-trained log; and
   a main control circuit, wherein after the training circuit sends the training command string, the training circuit respectively connects the receiving circuit and the transmitting circuit to the main control circuit.

2. The communication device according to claim 1, wherein the training circuit comprises a memory configured to store the being-trained log.

3. The communication device according to claim 2, wherein that the training circuit sending the training command string is that the training circuit
   simplifies the being-trained log, to obtain a plurality of simplified commands; and
   sends the simplified commands.

4. The communication device according to claim 3, wherein the training command string comprises the training commands, and that the training circuit simplifying the being-trained log is that the training circuit
   classifies the training commands;
   respectively obtains, according to the classifications and the training commands, an accumulated adjustment value corresponding to a same classification; and
   obtains the simplified commands according to a predetermined tolerance, the accumulated adjustment values, and the classifications.

5. The communication device according to claim 2, wherein when actuated, the main control circuit initializes the receiving circuit, the transmitting circuit and the training circuit.

6. The communication device according to claim 1, wherein that the training circuit performing the being-trained procedure is that the training circuit
   receives one of the training commands;
   processes the received training command, to update the being-trained log and to obtain the corresponding analysis result;
   when the analysis result is an adjustment, adjusts the transmission characteristic, and returns to the receiving step; and
   when the analysis result is completion, ends the being-trained procedure.

7. The communication device according to claim 6, wherein that the training circuit sends the training command string is that the training circuit
   simplifies the being-trained log, to obtain a plurality of simplified commands; and
   sends the simplified commands.

8. The communication device according to claim 7, wherein the training command string comprises the training commands, and that the training circuit simplifying the being-trained log is that the training circuit
   classifies the training commands;
   respectively obtains, according to the classifications and the training commands, an accumulated adjustment value corresponding to a same classification; and
   obtains the simplified commands according to a predetermined tolerance, the accumulated adjustment values, and the classifications.

9. The communication device according to claim 6, wherein when actuated, the main control circuit initializes the receiving circuit, the transmitting circuit and the training circuit.

10. The communication device according to claim 1, wherein that the training circuit sending the training command string is that the training circuit
   simplifies the being-trained log, to obtain a plurality of simplified commands; and
   sends the simplified commands.

11. The communication device according to claim 10, wherein the training command string comprises the training commands, and that the training circuit simplifying the being-trained log is that the training circuit
   classifies the training commands;
   respectively obtains, according to the classifications and the training commands, an accumulated adjustment value corresponding to a same classification; and
   obtains the simplified commands according to a predetermined tolerance, the accumulated adjustment values, and the classifications.

12. The communication device according to claim 1, wherein when actuated, the main control circuit initializes the receiving circuit, the transmitting circuit and the training circuit.

13. A communication method, wherein the communication method comprises:
   initializing a link;
   obtaining a being-trained log in response to a being-trained procedure; and
   sending a training command string according to the being-trained log; wherein the training command string is substantially the same as the be-trained log.

14. The communication method according to claim 13, wherein the being-trained procedure comprises:
   receiving a training command;
   processing the training command, to update the being-trained log and to obtain an analysis result;
   when the analysis result is an adjustment, adjusting a transmission characteristic, and returning to the receiving step; and
   when the analysis result is completion, ending the being-trained procedure.

15. The communication method according to claim 13, wherein the being- trained log comprises a plurality of training commands, and the sending the training command string is sending the training commands.

16. The communication method according to claim 13, wherein the sending the training command string comprises:
   simplifying the being-trained log, to obtain a plurality of simplified commands; and
   sending the simplified commands.

17. The communication method according to claim 16, wherein the training command string comprises the training commands, and the simplifying the being-trained log comprises:
   classifying the training commands;
   respectively obtaining an accumulated adjustment value corresponding to a same classification, according to the classifications and the training commands; and
   obtaining the simplified commands according to the accumulated adjustment values and the classifications.

18. The communication method according to claim 17, wherein the simplifying the being-trained log comprises an optimization procedure, the optimization procedure obtains the simplified commands according to a predetermined tolerance and the accumulated adjustment values.

19. The communication method according to claim 18, wherein the optimization procedure is configured to compensate a signal to reach the predetermined tolerance.

* * * * *